May 3, 1932.  G. W. ELSEY  1,856,753

DOUBLE ACTING SHOCK ABSORBER

Filed Oct. 15, 1928

Inventor
George W. Elsey
By Spencer, Hardman and Feiz
His Attorneys

Patented May 3, 1932

1,856,753

UNITED STATES PATENT OFFICE

GEORGE W. ELSEY, OF DAYTON, OHIO, ASSIGNOR, BY MESNE ASSIGNMENTS, TO DELCO PRODUCTS CORPORATION, OF DAYTON, OHIO, A CORPORATION OF DELAWARE

DOUBLE ACTING SHOCK ABSORBER

Application filed October 15, 1928. Serial No. 312,461.

This invention relates to improvements in shock absorbers particularly adapted for use on automotive or other vehicles which have a frame or body supported by springs upon the road wheel axles.

It is among the objects of the present invention to provide a smooth operating rebound shock absorber of simple structure and design, which will permit the springs of the vehicle to function as cushioning elements when the roadbed upon which the vehicle is being operated is comparatively smooth, said shock absorber, however, controlling the action of the vehicle springs when it is being operated over a comparatively rough roadbed.

Further objects and advantages of the present invention will be apparent from the following description, reference being had to the accompanying drawings wherein a preferred embodiment of one form of the present invention is clearly shown.

Figure 1:
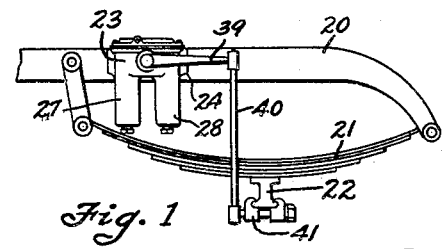
Fig. 1 is a diagrammatic fragmentary side view showing the vehicle frame and axle and a form of the present invention applied thereto.

Referring to the drawings the numeral 20 designates the frame of the vehicle upon which the body, not shown, is supported. Frame 20 has springs, one of which is shown at 21, hingedly attached thereto, said spring being mounted upon the axle 22 to which the road-wheels, not shown, are secured.

The shock absorber comprises a casing 23 having lugs 24 provided with screw threaded apertures 25 adapted to receive bolts by means of which said casing is attached to the frame 20. Casing 23 presents a fluid reservoir 26 and two cylinders 27 and 28 provided with end walls 29 and 30 respectively. A cap 31, provided with a gasket 32, is attached to the casing 23 by screws 33, and forms a liquid tight cover for the reservoir 26.

Within the cylinder 27 there is provided a reciprocable piston 35 and in the cylinder 28 a piston 36. Both of these pistons 35 and 36 are moved in the one direction, or toward the closed ends of their cylinders by an oscillatable lever 37 supported within the reservoir 26 on a rocker shaft 38 which is journalled in bearings provided by the walls of the casing 23. One end of said rocker shaft 38 extends outside the casing and has a lever 39 attached thereto. The free end of lever 39 has one end of a link 40 connected thereto, the other end of said link is attached to the axle 22 by a suitable clamp 41. Pistons 35 and 36 are moved in the opposite direction or away from the end walls 29 and 30 of their respective cylinders by springs 42 and 43, interposed between piston 35 and wall 29, and piston 36 and wall 30 respectively.

Referring particularly to what is termed the "bumper" portion of the shock absorber, including the cylinder 27 and its piston 35, said piston comprises a head portion 45 having an extending lug portion 46. A passage 47 through the piston head 45 provides for the transfer of fluid from one side of the piston to the other in response to reciprocation of said piston in the cylinder. A through passage 48 in the lug portion 46 of the piston head is coaxial of the piston. One end of this passage 48 communicates with the piston head passage 47, the other end has the wear piece 49 fitting thereinto, said wear piece having a head portion 50 engaging the left arm (according to Fig. 2) of the lever 37. In the inside wall of the piston head 45 is an annular recess which receives the valve-seat member 51, maintained in said recess by having one end of spring 42 abutting against it. The valve-seat member 51 has a cylindrical extension 52, substantially coaxial of the cylinder and a series of openings 53 provided between said extension 52 and the peripheral edge. A valve 54 is slidably supported upon the cylindrical extension 52 of the valve-seat member 51, and is yieldably maintained in engagement with the valve-seat member to close the openings 53, by a spring 55. Said spring 55 is interposed between the valve 54 and an abutment cup 56 which fits about the cylindrical extension 52 and is maintained against a shoulder provided thereon by the spring 57, of greater tension than the spring 55. The other end of spring 57 rests upon an abutment cup 58 attached to the valve member 59 by a C washer 60 which fits into an annular groove adjacent one end of valve member 58.

Figure 3:
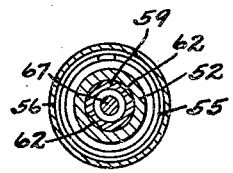
Fig. 3 is a fragmentary sectional view taken along the line 3—3 of Fig. 2.
Figure 4:
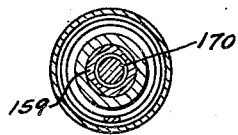
Fig. 4 is a view similar to Fig. 3 and taken along line 4—4 of Fig. 2.

The valve member 59 is slidably supported within the cylindrical extension 52 of the valve-seat member 51. An annular projecting ledge 61 on the valve member 59 is yieldably maintained in contact with the valve-seat member 51 by the spring 57 exerting pressure upon the abutment cup 58 secured to said valve member 59, thereby normally shutting off this path of communication between the piston head passage 47 and the portion of the cylinder beneath piston 35. As shown in the detail sectional view, Fig. 3, the outer surface of the valve member 59, beneath the ledge 61, has flat portions 62, providing passages between the valve 59 and the inner surfaces of the cylindrical extension 52, which becomes effective only as fluid conductors when the ledge 61 has been lifted or moved away from its seat on the valve-seat member 51. The valve member 59 has a portion 63 extending from the ledge 61 and into the through-passage 48 of the piston head lug 46, the outer diameter of said portion 63 being less than the diameter of said passage 48 thereby providing a passage between said extension 63 and the wall of passage 48. Valve member 59 is hollow, having a through-passage 64.

Figure 2:
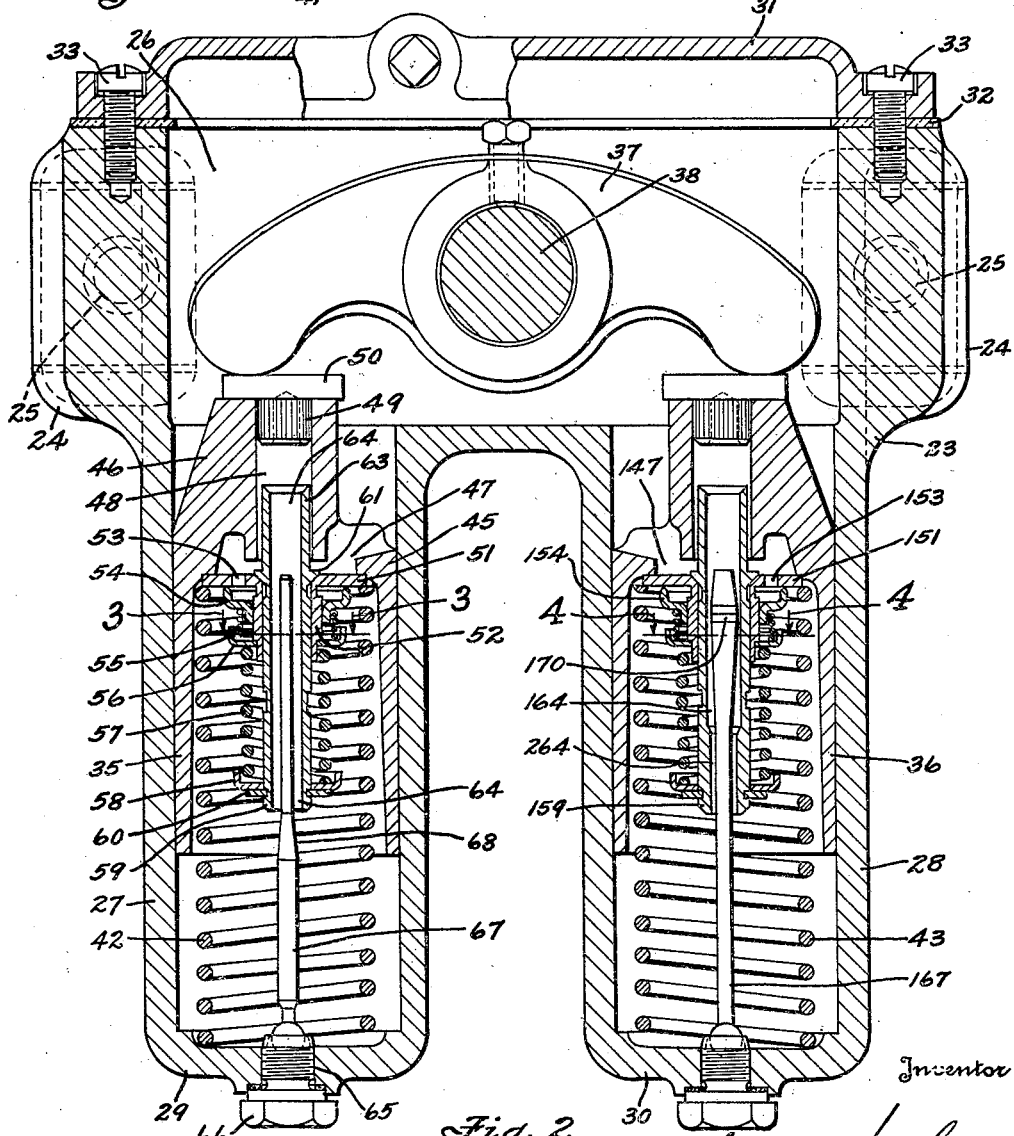
Fig. 2 is a longitudinal sectional view taken through the shock absorber.

In the wall 29 of cylinder 27 there is provided a screw-threaded aperture 65 substantially coaxial of said cylinder and in alinement with the axis of the valve-member 59. This aperture receives a screw 66 which swivelly supports a metering pin 67 extending into the through-passage 64 of valve 59 and, being of less transverse dimensions than said through-passage, provides a fluid passage of restricted area at this point. The metering pin comprises two sections of different transverse dimensions, connected by a tapering portion 68 which is located adjacent the outer end of valve member 59 when the piston 35 is in the normal position as shown in Fig. 2. The smaller dimensioned portion of the pin extends into the through-passage of valve 59.

The "snubber" side of the shock absorber comprising cylinder 28 and its piston 36 differs from the "bumper" side, already described, in a few details only. Valve 159 differs from valve 59 in that its through-passage 164 has two portions of different transverse dimensions instead of having a constant passage as valve 59. The smaller dimensioned portion of through-passage 164 is designated by numeral 264. The "snubber" metering pin 167 has a body portion of lesser transverse dimension than the reduced passage portion 264 through which said metering pin extends. Beyond said reduced portion 264 and inside the larger dimensioned portion of passage 164 the pin 167 has a tapering head portion 170, the largest dimensioned portion of the head being less transversed than the passage 164. In all other respects the various elements of the "snubber" side are similar to the members of the "bumper" side of the shock absorber.

*Mode of operation*

When the wheels of the vehicle strike obstruction in the road bed, springs 21 are flexed toward the frame 20 causing the link 40 to move the lever 39 to rotate the shaft 38 and its associate lever 37 in a counterclockwise direction as regards Fig. 2. Lever 37 will thus move bumper piston 35 toward the end wall 29 of its cylinder 27. Spring 43 will cause the snubber piston 36 to follow the movement of the right arm of lever 37 and thus move away from the end wall 30 of cylinder 28. Piston 35, moving toward wall 29 of its cylinder 27 will exert pressure upon the fluid in the cylinder beneath it, and thus valve 54 will be pressed into tight engagement with valve-seat member 51, preventing fluid from escaping from the cylinder through openings 53. Fluid now will flow from the cylinder 27 through the space between metering pin 67 and the wall of passage 64, into the passage 48 and through the space between the wall of said passage 48 and valve extension 63 into and through passage 47 into the fluid reservoir 26. For slight movements of piston 35 toward end wall 29 of its cylinder 27, caused by the road wheels striking small obstructions, the fluid passage between metering pin 67 and valve passage 64 will be sufficiently large to permit fluid to pass therethrough and prevent substantial resistance to piston movement thus permitting the vehicle springs 21 to absorb the slight shocks. However, when the piston has been moved so that the valve 59 passes beyond the tapered portion 68 of the metering pin 67 and encompasses the larger diameter portion of the pin 67, the fluid flow orifice between pin 67 and valve passage 64 will be of such size as to constantly restrict the flow of fluid therethrough and consequently, the continued movement of the piston 35 toward wall 29 will be relatively resisted, thus exerting a resistance to the flexing of the spring 21 toward frame 20. When a large obstruction is met by the vehicle wheels movement of the connecting parts 40, 39 and 37 will cause the piston to exert an excessive pressure upon the fluid therebeneath which pressure cannot be relieved by the escape of fluid through the orifice between pin 67 and valve 59. To provide a safety relief device, valve 59 is so constructed and arrayed that in response to excessive pressure in the cylinder it may lift against the effect of spring 57 to move its ledge 61 away from valve-seat member 51 and thus establish an additional flow of fluid from the cylinder through passages provided between the flat portions 62 on valve member 59 and the tubular portion of valve-seat member 51.

While the "bumper" piston 35 is moving toward the wall 29 of its cylinder 27, the "snubber" piston 36 is moving away from wall 30 of its cylinder, due to the effect of spring 43. This movement of piston 36 will cause the fluid in the reservoir 26 to force valve 154 from engagement with the valve-seat member 151 and thus uncover and open the passages 153, establishing a substantially free flow of fluid from the reservoir through passages 147 and 153 into the cylinder space beneath piston 36. Upon reverse movement of piston 36 due to the clockwise movement of arm 37 caused by the spring 21 tending to return to its normal position, valve 154 will again engage valve-seat member 151 and thus close passages 153. Piston 36 having been moved upwardly in cylinder 28, or in a direction away from end wall 30, portion 264 of valve passage 164 has approached the larger head portion of metering pin 167 and thus substantially reduced the orifice between said passage portion 264 and the metering pin, consequently providing for a restricted flow of fluid through said orifice. However, as the piston is being moved toward the end wall 30 and thus passage 264 is being moved toward the smaller dimensioned portion of the metering pin 167, the fluid passage between 264 and the pin 167 is gradually being increased. From this it may be seen that the restriction to the return flow of fluid, from cylinder 28 to the reservoir 26 in response to the movement of piston 36 by return to normal position of spring 21 is gradually decreased. Valve 159 like valve 59 may move to relieve excessive pressure within its respective cylinder.

What is claimed is as follows:

1. A shock absorber comprising in combination, a casing presenting a fluid reservoir and two cylinders, a piston in each cylinder, means for moving the piston in either direction, valves in each piston, one set of valves providing for the free flow of fluid from the fluid reservoir into the spaces beneath said pistons in response to the movement of said pistons in one direction, the other set of valves each having parallel passages one continually open, the other normally closed, both providing for the return flow of fluid from the cylinders to the reservoir at a restricted rate when the pistons are moved in the other direction; and metering means adapted to cooperate with the second mentioned set of valves of each piston, said metering means maintaining the restriction to the return flow of fluid from the one cylinder substantially constant and causing the valve of the other cylinder to gradually, decreasingly restrict the return flow of fluid from said other cylinder.

2. A shock absorber comprising in combination, a casing presenting a fluid reservoir and two cylinders, a piston in each cylinder; means for operating said pistons; and three fluid flow controlling devices carried by each piston in each cylinder adapted to control the transfer of fluid from one side of a piston to the other, one of said devices providing for an unrestricted transfer of fluid, in one direction, another for a transfer of fluid at a restricted rate in the opposite direction, and the third providing for such transfer in said opposite direction only when the pressure on one side of a piston becomes excessive.

3. A shock absorber comprising in combination, a casing presenting a fluid reservoir and two cylinders; a piston in each cylinder; means for operating said pistons; and three fluid flow controlling devices for each cylinder, the first of said devices in each cylinder providing for the transfer of fluid from one side of the piston to the other at a substantially unrestricted rate, the second device of one of said cylinders providing for a transfer of fluid reversed to the transfer mentioned above, at a substantially constantly restricted rate of flow, the second device of the other cylinder providing for such a reverse transfer of fluid at a variably restricted flow rate, and the third of said devices, providing in each of said cylinders for a reverse transfer of fluid, in addition to the flow provided by the second of said devices, only when the pressure on one side of said pistons reaches a predetermined high value.

4. A shock absorber for controlling the movements of two relatively movable members so that a relatively constant resistance is exerted against the approaching movement of said members and a variable resistance against their separating movement, said shock absorber comprising a casing connected with one movable member, presenting a fluid reservoir and two cylinders, a piston in each cylinder, piston operating means in the casing and connected with the other movable member, and fluid flow controlling means adapted to control the transfer of fluid from one side of the piston to the other, said means comprising two valves one adapted, in response to fluid pressure, to establish an unrestricted flow of fluid through the piston in one direction, the other, in response to fluid pressure, adapted to establish a restricted flow of fluid through the piston in the opposite direction, said other valve comprising a fluid passage in the respective pistons and metering pins provided in the cylinders and cooperating with said fluid passages to control the flow of fluid therethrough.

5. A shock absorber comprising in combination, a fluid containing casing; a cylinder communicating with said casing; a piston in said cylinder; valves in said piston providing for the free flow of fluid from the casing to the cylinder when the piston moves in one direction and the restricted return flow of fluid from the cylinder to the casing when the piston moves in the opposite direction; and a cushioning means provided by the piston and the fluid returning therethrough to the casing providing no added restriction to the return flow of fluid from the cylinder, but substantially eliminating the chattering and noisy operation of the valve providing for the restricted fluid flow.

6. A shock absorber comprising in combination, a fluid containing casing; a cylinder communicating with said casing; a piston in said cylinder; valves in said piston providing for the free flow of fluid from the casing to the cylinder when the piston moves in one direction and the restricted return flow of fluid from the cylinder to the casing when the piston moves in the opposite direction; and means, comprising a recessed portion in the piston into which loosely fits an extending portion of the fluid flow restricting valve, apertured to direct the fluid passing through said valve into the said recessed portion, for cushioning the movements of the said valve to eliminate chattering thereof and noisy operation.

7. A shock absorber comprising, in combination, a casing presenting a fluid reservoir and cylinders; a piston in each cylinder, each piston having a passage providing for the transfer of fluid from one side of the piston to the other; means for reciprocating said pistons; a valve in each piston operable to establish a substantially free flow of fluid through the respective piston passage in one direction only, in response to the movement of the respective pistons in one direction; a tubular valve carried by each piston, adapted, in response to movement of the respective piston in the other direction, first to establish a flow of fluid therethrough and through the piston passage and then, at excessive pressure to move relative to the piston to establish a restricted flow around it and through the piston passage.

8. A shock absorber comprising, in combination, a casing presenting a fluid reservoir and cylinders; a piston in each cylinder, each piston having a passage providing for the transfer of fluid from one side of the piston to the other; means for reciprocating said piston; a valve in each piston operable to establish a substantially free flow of fluid through the respective piston passage in one direction only, in response to the movement of the respective pistons in one direction; a tubular valve carried by each piston, adapted, in response to movement of the respective piston in the other direction, first to establish a flow of fluid therethrough and through the piston passage and then, at excessive pressure to move relative to the piston to establish a restricted flow around it and through the piston passage, and a metering pin in each cylinder extending into the tubular valve, for controlling the flow of fluid therethrough in accordance with the position of the piston within the cylinder.

9. A shock absorber comprising, in combination, a casing presenting a fluid reservoir and cylinder; a piston in the cylinder, said piston having a passage providing for the transfer of fluid from one side of the piston to the other; means for reciprocating said piston; a valve seat member adjacent the piston passage, said member having a cylindrical extension aligning with an opening in said member, and a plurality of openings about said extension; a valve supported upon said cylindrical extension for closing the openings about said extension as the piston is moved in one direction; a tubular valve supported within said extension and having an annular flange engaging the peripheral edge of the opening aligning with said extension, said valve establishing a flow of fluid therethrough and through the piston passage as the piston is moved in said one direction, said valve being movable relative to the valve seat member by fluid pressure to establish a flow of fluid through the cylindrical extension of said member and through the piston passage in response to excess pressure within the cylinder.

10. A shock absorber comprising, in combination, a casing presenting a fluid reservoir and cylinder; a piston in the cylinder, said piston having a passage providing for the transfer of fluid from one side of the piston to the other; means for reciprocating said piston; a valve seat member adjacent the piston passage, said member having a cylindrical extension aligning with an opening in said member, and a plurality of openings about said extension; a valve supported upon said cylindrical extension for closing the openings about said extension as the piston is moved in one direction; a tubular valve supported within said extension and having an annular flange engaging the peripheral edge of the opening aligning with said extension, said valve establishing a flow of fluid therethrough and through the piston passage as the piston is moved in said one direction, said valve being movable relative to the valve seat member by fluid pressure to establish a flow of fluid through the cylindrical extension of said member and through the piston passage in response to excess pressure within the cylinder, and a metering pin secured within the cylinder and extending into the tubular valve.

In testimony whereof I hereto affix my signature.

GEORGE W. ELSEY.